AUTOMATIC TELEPHONE DIALER

Filed July 10, 1961

3 Sheets-Sheet 1

INVENTOR.
Vincent A. Iannucci
BY
ATTORNEY.

AUTOMATIC TELEPHONE DIALER

Filed July 10, 1961 3 Sheets-Sheet 2

INVENTOR.
Vincent A. Iannucci
BY Carl S. Olson
ATTORNEY.

Sept. 28, 1965 V. A. IANNUCCI 3,209,077

AUTOMATIC TELEPHONE DIALER

Filed July 10, 1961 3 Sheets-Sheet 3

INVENTOR.
Vincent A. Iannucci
BY
ATTORNEY.

United States Patent Office 3,209,077

Patented Sept. 28, 1965

3,209,077

AUTOMATIC TELEPHONE DIALER

Vincent A. Iannucci, Lincoln Park, West Lawn, Pa., assignor to Textile Machine Works, Wyomissing, Pa., a corporation of Pennsylvania Filed July 10, 1961, Ser. No. 122,961
10 Claims. (Cl. 179—90)

The instant invention relates to devices termed "Automatic Telephone Dialers," namely devices of the type where any one of a number of call keys are adapted to automatically initiate a telephone call. More specifically the invention concerns modifications of and improvements on the device disclosed in my co-pending application Serial No. 83,544, filed January 18, 1961, entitled "Automatic Telephone Dialer," the present application being a continuation-in-part of said prior application.

The dialer disclosed in my said prior application provides for the support of a plurality of call keys in a magazine mounted for rotation to bring any one of said call keys into alignment with, and automatic connection to, a traction member adapted for operation to move the aligned key through forward and reverse strokes past a pulsing bar. Each key carries, on a longitudinal edge thereof, call initiating indicia comprising spaced units, each unit made up of a number of teeth corresponding to the digit represented thereby. The traction member is either manually or motor driven to draw the key through its forward stroke past the pulsing member which however is inactive during this stroke. For the return stroke the traction member, and hence the key, is driven by a governor controlled spring motor. During this return stroke the individual teeth of the pulsing units cause oscillations of the pulsing bar which in turn make and brake a pulsing switch to deliver the dialing impulses to the automatic telephone switching system.

It has been found that with the construction described above the extreme accuracy necessary in the size and positioning of the teeth on the key to maintain the essential make and break ratio required by the switching system adversely affects the commercial possibilities of the device. The instant invention has for its principal object the provision of an improved dialing mechanism which will eliminate this difficulty. More particularly, the principal object of the invention is the provision of a dialer in which the make and break ratio is determined by cam means, and the indicia on the dialing key is employed for controlling the period of operation of such cam means to provide the number of pulses corresponding to the particular digit involved. The foregoing object is attained by a dialer, operable by any selected one of a number of keys, as in my prior dialer, in which the pulsing device comprises a multilobed cam driven at intervals and at a predetermined speed to bring the lobes into contact with a pulsing switch, the individual lobes of the cam being of identical contour and spacing whereby the make and break ratio is predetermined and remains constant. The occurrence and length of the intervals of operation of the cam to produce numbers of pulses corresponding to the digits of the telephone number called is determined by the indicia on the selected key.

A further object of the invention is the provision of a dialer attaining the foregoing objects in which the selected key is driven through its operative stroke by constant speed motor means correlated to the constant speed drive for the pulsing cam. A further object is the provision of such a device in which the indicia carried by each key constitutes a succession of elevated and recessed areas on a longitudinal edge thereof, the elevated areas being adapted for cooperation with a detector or probe forming a portion of a control means for the pulsing cam whereby upon contact of the probe with an elevated area the pulsing cam is permitted to rotate through an interval, and hence to initiate a number of pulses, measured by the length of such elevated area.

A still further object of the invention is the provision of a dialer attaining the foregoing objects and which employs a rotatable pulsing cam and in which said control includes means for releasing said cam for rotation and for stopping said rotation both as determined by the indicia on the selected key. More specifically an object is the provision of a control of the type referred to which provides for an appreciable interval of travel of the cam at any point of which the cam stopping means may be moved to operative position.

Another object of the invention is the provision of a dialer incorporating many of the features of my prior dialer, e.g. the key holding and selecting means, but embodying the improvements defined above as well as other features hereinafter to be referred to.

My invention will be more fully understood and further objects and advantages thereof will become apparent when reference is made to the more detailed description to follow and to the accompanying drawings in which.

Figure 1:
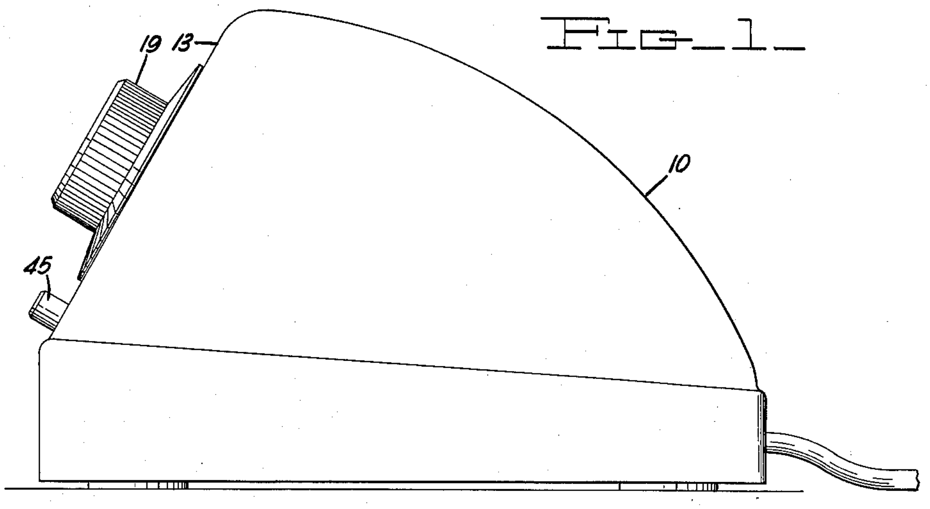
FIGURE 1 is a side elevational view of a dialer in accordance with the instant invention.
Figure 2:
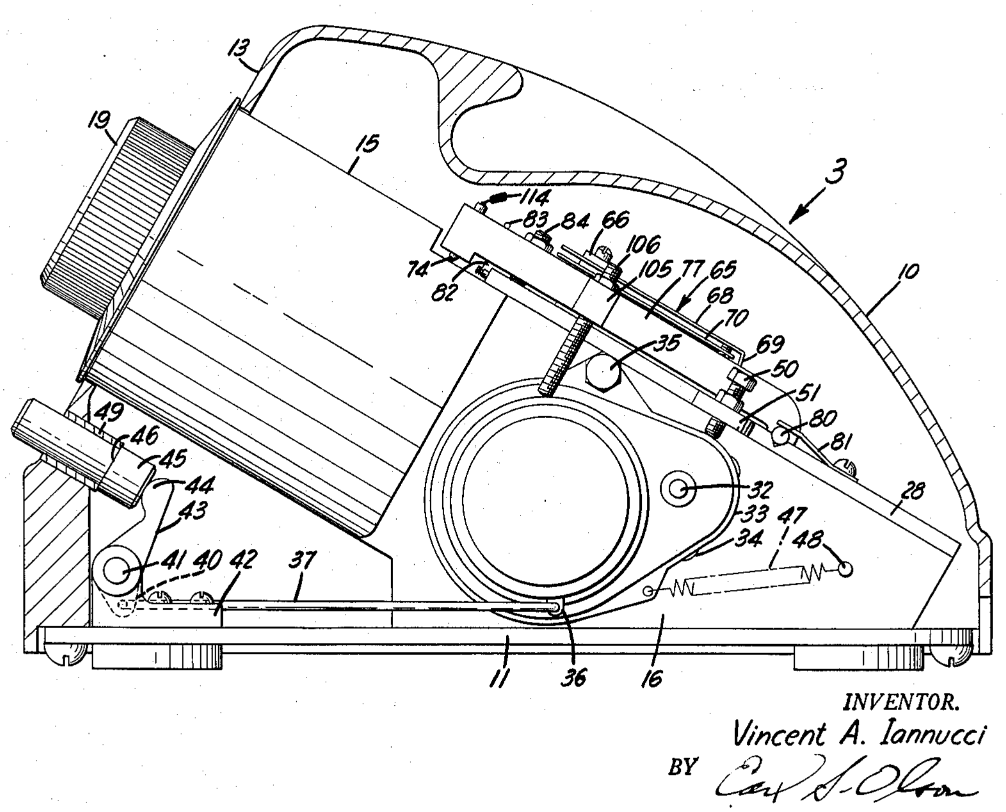
FIG. 2 is a longitudinal sectional view on an enlarged scale taken through the dialer of FIG. 1 and disclosing the working parts thereof.

Referring now to the drawings and more particularly to FIGS. 1 and 2, there is shown a preferred embodiment of an automatic dialer incorporating the instant invention. The dialer in its general organization and particularly with respect to the case structure, the key magazine, and the manner and means for mounting the keys therein and removing them therefrom, is substantially identical to that of my said prior application. Hence as reference may be made thereto for details of these features they will be only briefly described herein. The dialer comprises a cover 10 made of plastic, metal or other suitable material and shaped to enclose the working mechanism of the dialer, the latter being supported from a base 11. The base and cover are secured together in any desired manner as by the screws shown. An inclined forward face 13 of the cover has a circular opening through which projects a casing 15 forming a part of a support block 16 and having a cylindrical bore 17 (see FIG. 4) rotatably receiving the cylindrical key magazine 18 supporting the call keys around its periphery in radially extending slots. The key magazine has a manually operated knob 19 whereby the magazine may be rotated to bring any key into a position for a longitudinal movement through a number calling operation, all as described in my co-pending application.

As in said prior application each of the keys 23, all of the keys being identical except as to the call indicia thereon, is provided with a hook end 24 (FIGS. 4 and 6) adapted for automatic engagement with a hook end 25 of a traction member 26 when the key is brought by rotation of the magazine into alignment with the traction member. Traction member 26 is mounted in a groove 27 in the upper wall of support block 16, the groove being closed by a cover plate 28 secured thereto as by screws to define an elongated passageway into which an aligned one of the keys is adapted to be drawn by the traction member and thereafter returned to the magazine. Traction member 26 is provided with rack teeth, indicated diagrammatically at 30, on its lower edge.

In accordance with the instant invention rack teeth 30 are adapted to mesh at times with the teeth of a spur gear 31 carried by a shaft 32 for rotation therewith, said shaft constituting the drive or output shaft of a synchronous motor 33 (FIG. 2). A recess 34 is provided in support block 16 to accommodate gear 31, the recess extending substantially below the gear when the latter is in the position illustrated in FIG. 4 to permit movement of the gear away from the traction member as will be hereinafter explained. Motor 33, which is of a conventional geared type, is mounted as a unit for rocking movement about a stud 35 extending through an extension of the motor frame and threaded into support block 16 (see FIG. 2). A portion of the motor frame at a point approximately opposite stud 35 is provided with an ear 36 having a perforation therein receiving one end of a link 37. The opposite end of link 37 is received in a perforation adjacent the free end of a lever arm 40. Lever arm 40 is keyed or otherwise secured to a pin 41 mounted for rocking movement in a bearing block 42 carried by base 11. At the opposite side of the bearing block from lever arm 40 pin 41 supports a second lever arm 43 also keyed or otherwise fixed to the pin for rotation therewith and having a nose 44 in position to be contacted by the inner enlarged end of a push button 45. The push button is mounted in a sleeve or bushing 49 in the front wall of the casing 10 in a position to be conveniently manually manipulated, a shoulder 46 formed by the enlarged inner end of the push button engaging the sleeve when the push button is in its rest position.

A tension spring 47 has one end connected to the frame of motor 33 at a point relatively adjacent ear 36 and its other end connected to a pin 48 projecting from support block 16, the spring being tensioned to urge motor 33 to swing on stud 35 in a counterclockwise direction, as viewed in FIG. 2. The limit of the swinging motion is determined by an adjustable stop screw 50 threaded into an extension 51 of cover plate 28 and adapted to contact a portion of the motor frame as illustrated in FIG. 2.

It will be understood from the foregoing description that in its rest position, illustrated in FIG. 2, with the motor frame in contact with stop 50, gear 31 is in meshing engagement with the rack teeth of traction member 26. Upon depression of push button 45 the levers and linkage above described cause motor 33 to be swung on stud 35 in a clockwise direction as viewed in FIG. 2 thereby moving gear 31 out of mesh with the rack teeth to the position illustrated in broken lines in FIG. 4. Upon release of the push button spring 47 immediately returns the motor to its rest or rack engaging position.

Figures 5, 6, 7:
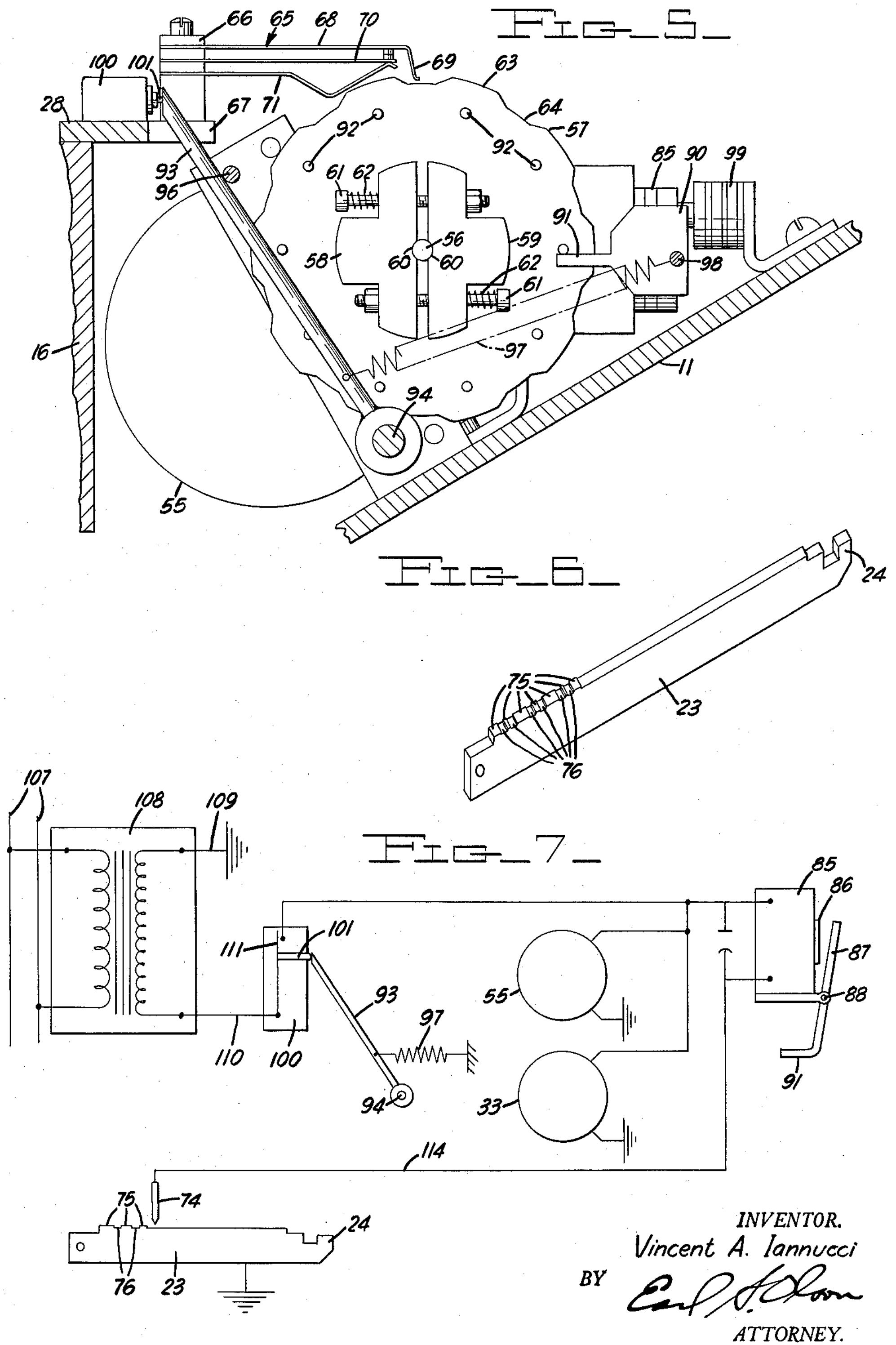
FIG. 5 is a sectional view on an enlarged scale taken on the line 5—5 of FIG. 3 looking in the direction indicated by the arrows.
FIG. 6 is a detail perspective view on an enlarged scale of a call key employed in the instant invention.
FIG. 7 is a wiring diagram illustrating the electrical circuitry employed in the instant invention.

Mounted on the opposite side of support block 16 from motor 33 is a second synchronous motor 55 of conventional geared type the drive or output shaft of which is illustrated at 56 in FIG. 5. Loosely mounted on shaft 56, for rotation thereby at certain times, is a pulsing cam disk 57. A friction or slip drive connection is provided between shaft 56 and cam 57 comprising a clutch segment 58 fixedly secured to cam disk 57 and a similar clutch segment 59 floating with respect to the cam disk. The clutch segments have semicircular recesses 60 adapted to partially embrace shaft 56. Floating segment 59 is resiliently urged toward fixed segment 58, and both segments toward the shaft for clutching engagement therewith, by headed bolts 61 extending loosely through openings in the segments and carrying compression springs 62 between the heads thereof and the segments.

As will be recognized the mechanism described provides a friction drive or slip clutch between shaft 56 and cam disk 57 whereby the cam disk would normally rotate with shaft 56 but can be held against rotation by means hereinafter to be described.

Cam disk 57 carries on its periphery a succession of identical cam lobes 63 separated by identical dwells 64 so proportioned that a predetermined make and break ratio will be imparted to a pulsing switch 65. Pulsing switch 65 is of the type used in conventional telephone dials, and is similar to that shown at 62 in my said copending application, and as will be understood the making and breaking action of the switch delivers dialing impulses to the automatic telephone switching system. The switch is mounted with the contact leaves thereof insulated from the unit and from each other on a block 66 supported on an extension 67 of cover plate 28. A contact leaf 68 of switch 65 has a downwardly extending flange 69 adapted to ride on lobes 63 to move its contact away from a second contact carried by a leaf 70. A third leaf 71 serves as a vibration dampener but has no other function in so far as the pulsing operation is concerned.

Figure 3:
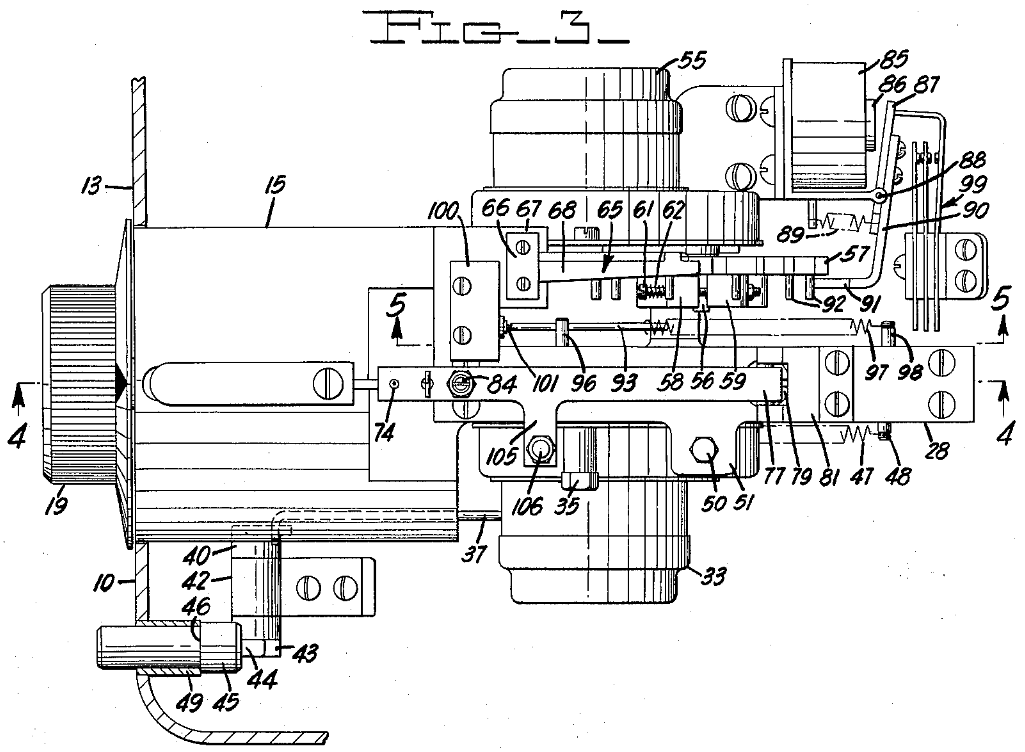
FIG. 3 is a view taken in the direction of the arrow 3 of FIG. 2 with a portion of the cover removed and certain parts omitted.

The mechanism for controlling the intervals of operation of the pulsing cam will now be described. For the purpose of the instant invention the individual keys 23 (see FIG. 6) are provided on their longitudinal upper edges with dialing indicia constituting elevated areas 75, representing individual digits of telephone numbers separated by depressed areas 76. A probe 74, adapted to cooperate with the elevated areas 75 upon a return stroke of the key as will hereinafter be explained, is carried by a probe arm 77 pivotally mounted on cover plate 28. As illustrated a downwardly curved end of probe arm 77 projects into an opening 79 in the cover plate and carries a pintle 80 projecting ends of which lie in recesses in the cover plate (FIG. 2). The ends of the pintle are held in the recesses by prongs of a leaf spring 81. However the particular construction of the pivot is immaterial to the invention. Probe arm 77 may be constructed of insulating material as illustrated but in any event probe 74 is electrically insulated from the metallic portions of the dialer. The probe arm is yieldably urged in its downwardly rotated position as by spring 82 connected to the arm and to a pin 83 secured in the cover plate. The downwardly rotated position of the probe arm is determined by a stop screw 84 threaded through the arm and adapted to contact cover plate 28. Probe 74, which is of electrical conductive material, is connected into a circuit, hereinafter referred to in more detail, which also includes the core 86 of an electromagnet 85 (FIGS. 3 and 7). An armature 87 of electromagnet 85 is pivoted as at 88 and yieldably urged away from the core as by tension spring 89. Secured to armature 87 is a plate 90 having an end portion extending at approximately right angles to the main part of the plate and shaped to define a tongue 91 adapted, when the electromagnet is de-energized and the armature in the position illustrated in FIG. 3, to project between adjacent ones of a circular series of pins or abutments 92 projecting from a face of cam disk 57. As illustrated particularly in FIG. 5 the spacing of the pins 92 conforms to the spacing of the lobes 63, there being a pin opposite the midpoint of each cam lobe.

A shunt switch 99 is mounted on the base in position to be opened by the armature 87 when the electromagnet is de-energized as illustrated in FIG. 3. The shunt switch is of the type conventionally used in telephone dials. When closed, which occurs during each pulsing sequence, it shunts out the phone with respect to its transmitting and receiving functions.

Traction member 26, as previously explained, has rack teeth 30 on the lower edge thereof which at certain times mesh with driving gear 31 of motor 33, the rack teeth and gear however being disengaged upon the rocking movement of motor 33 on its pivot 35 when push button 45 is depressed. Also as previously noted the direction of rotation of motor 33 is such as to drive traction member 26 through its return stroke, namely, to the left as viewed in FIG. 4. For driving the traction member in the opposite direction a spring loaded means is employed comprising an arm 93 (see FIGS. 3, 5 and 7) pivotally mounted on a pin 94 projecting from base block 16. A vertical wall of passageway 27 adjacent arm 93 is slotted as illustrated at 95 (see FIG. 4) to accommodate a pin 96 carried by traction member 26 and projecting through the slot and into the path of arm 93. Arm 93 is urged to rotate in a clockwise direction, as viewed in FIG. 5, by a spring 97 having one end secured to arm 93 and the other end to a pin 98 projecting from base block 16. A master switch 100 is mounted on the extension 67 of cover plate 28, the switch including a button 101 so located as to be depressed by the end of arm 93 when the latter reaches the limit of its motion in a counterclockwise direction. Switch 100 is of the type which is opened by the depression of button 101.

Probe arm 77, hereinbefore referred to, carries a lateral extension 105 (see FIG. 3) overlying a portion of the casing of motor 33. Threaded into the extension 105 is an adjustably mounted stop screw 106 the lower end of which lies in abutting relationship to the motor casing when the parts are in the positions illustrated in FIG. 2.

The electrical circuit employed is illustrated in FIG. 7. As there shown electrical energy from power leads 107 is reduced in voltage by a transformer 108. Extending from the output side of the transformer are a ground lead 109 and a second lead 110 connected to a movable contact 111 of switch 100. A lead from the fixed contact of the switch extends to motors 33 and 55, connected in parallel, and to one side of the coil of electromagnet 85. The other side of the coil of the electromagnet 85 is connected by a lead 114 to probe 74.

Figure 4:
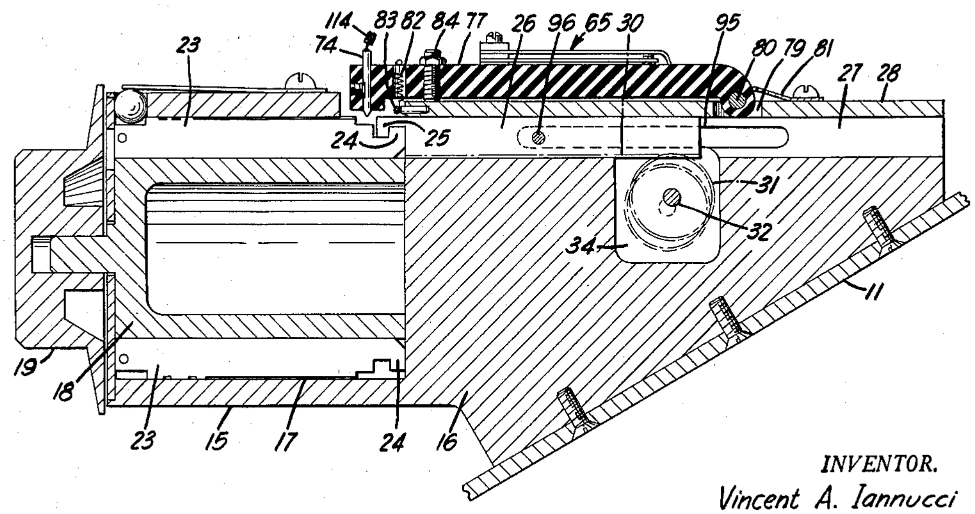
FIG. 4 is a sectional view taken on a line 4—4 of FIG. 3 looking in the direction indicated by the arrows.

In the rest condition of the dialer the parts are in the positions illustrated in FIGS. 2, 3 and 4. Traction member 26 is in its forward position with its rack teeth in mesh with gear 31 and its hook end interengaged with the end of the call key, if any, in the key receiving slot of the magazine 18, which slot is in the upper or twelve o'clock position. The end of arm 93 is maintained in position by pin 96 to hold switch 100 in opened condition and the electrical circuit hence is de-energized. Armature 87 of electromagnet 85 is held away from core 86 by spring 89, the armature in turn holding shunt switch 99 open and prong 91 beneath one of the pins or abutments 92. Probe 74 is positioned in the path of and to be contacted by the elevated areas only of the key, thls position being determined by adjusting screw 84.

When it is desired to call a number key magazine 18 is rotated as described in my said co-pending application to bring any selected one of the keys therein into alignment with passageway 27, this action automatically interengaging hook portions 24 and 25 of the key and traction member 26, respectively. Push button 45 is then manually depressed thereby, through link 37 and levers 40 and 43, rocking motor 33 in a clockwise direction as viewed in FIG. 2 about stud 35. The rocking of motor 33 moves gear 31 downwardly to disengage its teeth from the rack teeth of traction member 26 and the rack is immediately moved inwardly, to the right as viewed in FIG. 4, under the influence of gravity and of spring loaded arm 93 until pin 96 contacts the inner end of slot 95. The traction member draws the selected key with it into passageway 27 the key at the completion of the movement lying with the elevated area 75 adjacent the outer or left end of the key to the right or inwardly of probe 74. During this inward passage of the key probe 74 is out of contact with the elevated areas as the probe arm 77 is rocked upwardly on its pivot by the intervention of the motor casing and screw 106. The initial movement of arm 93 away from its rest position releases button 101 and permits master switch 100 to close thereby energizing the circuit and starting rotation of synchronous motors 33 and 55. However at this stage neither motor exerts its normal driving function as drive gear 31 of motor 33 is disengaged from the rack teeth and cam disk 57 is held against movement by the inward projection of tongue 91 beneath a pin or abutment 92.

Upon release of push button 45 motor 33 is rocked in a counterclockwise direction under the influence of spring 47 to engage gear 31 with the rack teeth on traction member 26 whereby the traction member and hence the selected key are moved through the return stroke at a uniform speed under the control of synchronous motor 33. This brings the elevated areas 75 of the key successively beneath probe 74 which in the meantime has again swung, under the influence of spring 82, to its position of FIGS. 2 and 4. As the first of the elevated areas contacts the probe the circuit is closed to electromagnet 85 which is energized to draw armature 87 toward core 86 and remove tongue 91 from beneath pin or abutment 92. This movement of the armature also permits shunt switch 99 to close. Upon withdrawal of the tongue 91, cam disk 57 is driven by synchronous motor 55 through the slip clutch to bring a succession of the lobes 63 and dwells 64 past pulsing switch 65 to cause the making and breaking of the switch. This pulsing operation continues until probe 74 rides off the elevated area thus opening the circuit to the electromagnet and permitting tongue 91 to swing inwardly between two adjacent pins or abutments 92, the rotation of the cam wheel coming to a stop upon contact of the next approaching pin or abutment with the tongue. As will be understood the length of the elevated area of the key is correlated to the rotational speed of pulsing cam 57, which in turn is under the control of the constant speed synchronous motor, to permit a predetermined number of pulses to be transmitted by pulsing switch 65, the number corresponding to a first digit of the telephone number being called. As the key continues to be driven in its return stroke a second elevated area 75 contacts probe 74, electromagnet 85 is again energized to release the pulsing cam 57 for rotation through a period determined by the length of such second elevated area to cause a second predetermined number of pulses equal to the second digit of the telephone number being called. This action continues until the complete number has been called, the return stroke of the key and traction member thereafter continuing idly until they are again in their rest positions illustrated in FIG. 4. In the meantime the contact of pin 96 with arm 93 has caused the latter to be swung in the counterclockwise direction, as viewed in FIG. 5, to load spring 97 and to finally contact button 101 of switch 100 and open the circuit whereupon the circuit is de-energized and the operation of the motors 33 and 55 is discontinued.

Inasmuch as the indicia, namely, the raised areas on keys 23, are employed only to determine intervals of operation of the pulsing cam they have no effect on the make and break ratio of the pulsing switch 65, the latter being controlled entirely by the cam and hence being constant irrespective of any minor inaccuracies in the arrangement of the indicia on the key. Furthermore such inaccuracies within reasonable limits otherwise have no harmful effect as tongue 91 may be inserted at any point between two adjacent pins or abutments 92 and be in position to stop rotation of the cam upon the contact of the following of said adjacent abutments with the tongue.

It will further be understood that while the key illustrated (see FIG. 6) carries indicia defining a seven digit number, or a combination of call letters and digits, the dialer is not so limited as a greater or lesser number of digits may be employed as is permissible by the switching system and within the capacity of the length of the key. Also while the key is illustrated as having elevated areas, separated by depressed areas, as the indicia for making electrical contact with the probe it will be obvious that other forms of indicia may be employed. For example a dielectric coating may be employed in lieu of the depressed areas to separate the intervals in which the probe closes contact with the key.

Having thus described the invention in rather full detail it will be understood that these details need not be strictly adhered to and that various changes and modifications may be made all falling within the scope of the invention as defined by the subjoined claims.

I claim:

1. In a telephone dialer a call initiating mechanism comprising a call key having longitudinally spaced indicia thereon, a rotatable pulsing member having a continuous circular series of cam lobes, means for rotating said pulsing member, a circular series of spaced abutments on said pulsing member one of said abutments being aligned with each of said lobes, means movable into and out of position to be contacted by any one of said abutments to stop rotation of said pulsing member, and means under the control of the indicia on said key for moving said movable means between said positions.

2. In a telephone dialer as claimed in claim 1 in which said key is mounted for longitudinal movement in both directions, and said means for moving said movable means between said positions comprises a probe mounted for contact with the indicia on said key in one direction of longitudinal movement of the key and an electromagnet, said probe and electromagnet being electrically connected whereby said electromagnet is energized to move said movable means out of a position to contact the said abutments upon contact of said probe with indicia on said key.

3. In a telephone dialer as claimed in claim 2 in which there is means to drive said key at constant speed in said one direction of longitudinal movement.

4. In a telephone dialer as claimed in claim 3 in which said drive means for said pulsing member and for said key comprise synchronous electric motors.

5. In a telephone dialer a call initiating mechanism comprising a key having indicia thereon, means supporting said key for longitudinal movement in both directions, motor means for driving said key at constant speed through one of said movements, a rotatable pulsing cam, motor means for rotating said pulsing cam, an interruptable drive connection between said second mentioned motor means and said pulsing cam, and means under the control of the indicia on said key during longitudinal movement thereof in said one direction for interrupting said drive connection.

6. In a telephone dialer as claimed in claim 5 means for disconnecting said first mentioned motor means from said key, and spring loaded means for moving the key in a direction opposite to said one direction upon said disconnection.

7. In a telephone dialer as claimed in claim 6 in which said first motor means and said second motor means are connected into an electrical circuit including a switch, and there is means for opening said switch upon completion of the longitudinal movement of said key in said one direction.

8. In a telephone dialer as claimed in claim 7 in which operation of said means for moving said key in said opposite direction serves to close said switch to energize said motor means.

9. In a telephone dialer a call initiating mechanism comprising a key having indicia thereon, means supporting said key for forward and reverse longitudinal movements, spring loaded means for driving said key through a forward movement, motor means for driving said key through a reverse movement, means for disconnecting said motor means from said key, said spring loaded means becoming effective upon said disconnection, a pulsing cam disk, motor means for rotating said disk, an interruptable drive connection between said second mentioned motor means and said disk, means for energizing said first and second motor means upon disconnection of said first motor means from said key, and means under the control of the indicia on said key during a reverse movement thereof for interrupting said drive connection between said second mentioned motor means and said disk.

10. In a telephone dialer as claimed in claim 9 in which said key has rack teeth on a longitudinal edge thereof and said first motor means includes a gear adapted to mesh with said rack teeth, and said disconnecting means includes a movable mounting for said motor, and means for moving said mounting to disengage said gear from said rack teeth.

References Cited by the Examiner

UNITED STATES PATENTS

| | | | |
|---|---|---|---|
| 1,037,172 | 8/12 | Clement | 179—90 |
| 2,114,469 | 4/38 | Hirschfeldt | 179—90 |
| 2,537,974 | 1/57 | Devaux | 179—90 |
| 2,880,278 | 3/59 | Vandenberg | 170—90 |
| 3,104,286 | 9/63 | Whitney | 179—90 |

FOREIGN PATENTS

| | | |
|---|---|---|
| 545,709 | 7/56 | Italy. |

ROBERT H. ROSE, *Primary Examiner.*